Jan. 3, 1950

A. E. MURRAY 2,493,310

PROCESS OF MAKING FORM-RETAINING
MATERIALS AND PRODUCTS THEREOF

Original Filed July 9, 1941

INVENTOR
Alan E. Murray
BY
Arthur Wright
ATTORNEY

Patented Jan. 3, 1950

2,493,310

UNITED STATES PATENT OFFICE 2,493,310

PROCESS OF MAKING FORM-RETAINING MATERIALS AND PRODUCTS THEREOF

Alan E. Murray, New York, N. Y.

Original applications March 17, 1943, Serial No. 479,531, and July 9, 1941, Serial No. 401,597, now Patent No. 2,332,000. Divided and this application April 13, 1949, Serial No. 87,208

12 Claims. (Cl. 154—106)

My invention relates particularly to a process of producing molded objects having many advantages over previous processes, as well as the products thereof.

The object of my invention is to provide a novel process, and products of manufacturing molded objects, which may be carried out effectively by the use of sheet materials with the aid of plastics, liquids, etc. A further object is to make the above by means of a novel method of lining the same, involving reinforcement of such a character as to prevent deformation and deterioration of the same. Still another object is to provide means for securing internal marginal contours free from any disadvantageous angles. One of the objects, furthermore, is to provide a method of controlling the design by applying cords to the lining and molding leather or other material over the same. Again, a further object is to provide an improved method of molding the leather so as to remain set in its three dimensional positions conforming to the contours. I have found that this may be acomplished advantageously by the softening and double impregnation of the leather with a liquid which is allowed to set while the leather is in its desired three dimensional positions. Again, a further object is to provide a process of manufacture so as to produce objects from which sewed seams and angular grooves are absent, thus avoiding unnatural unevennesses. Further objects of my invention will appear from the detailed description of the same hereinafter.

Figure 1:
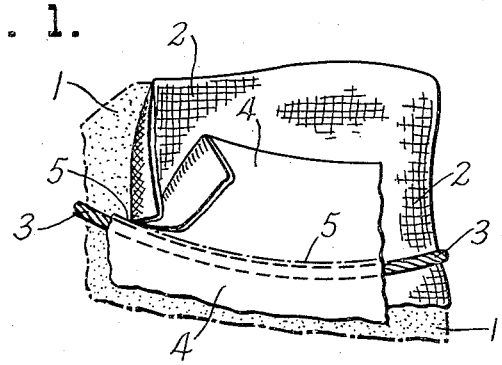
Figure 2:
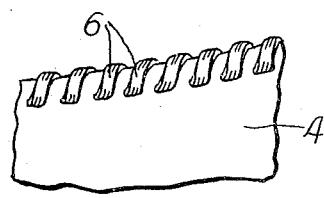
Figure 3:
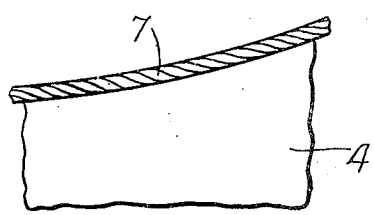

While my invention is capable of being carried out in many different forms, I have illustrated, by way of example in the accompanying drawings, only certain forms of my invention and certain stages in the manufacture of the same, in which Fig. 1 is a side elevation showing a three dimensional surface in the form of a sheet of leather impregnated throughout the body thereof with latex set in the form thereof on a fabric, having a curved edge, with interposed cord at the edge thereof;

Fig. 2 is a fragmental side elevation thereof, showing a thong binding material which may be used thereon; and Fig. 3 is a side elevation of a modification thereof with a cord on the outside of the outer layer of leather or other outer layer located thereon.

In carrying out my process I make use of a form support I which has a surface curved in three dimensions. Over the bottom of the form I so made I place a coat of thin library or starch paste and then apply over the same a normally flat loosely woven fabric 2, such as monk's cloth, cotton or linen, cut to the size which is made to conform to the three-dimensional surface of the form I. I now prepare a water solution of prevulcanized or self-vulcanized rubber containing approximately 60% of the rubber body and 40% of water, generally known as "latex," or other elastic materials. However, throughout my process it is to be understood that latex is by far preferable to all other known adhesive and plastic materials for the purpose of carrying out my present invention.

The whole of the form I is now covered with the piece of normally flat fabric 2 that is cut to a sufficient size to cover the entire form I plus sufficient excess to allow for pinching and pulling, and this cover 2, the surface of which has had applied thereto the said solution of latex or other bonding material, is then laid on the top of the form I. The free edges of the cloth 2 are now drawn together and pulled or pinched so as to closely conform the cloth over-all to the contours of the form I. The cloth is pinched and pulled, drawing the whole tightly on the form I until it adheres, owing to the tackiness of the bonding material. When the bonding material is set quite firmly any great excess of the cloth 2 is clipped off with scissors. The form I is now covered with the layer of fabric 2, conforming closely with the contours of the form I.

In order to apply lines to the form for forming a curved edge preparatory to placing a final covering on the same, I may first draw with a pencil any desired lines on the outside of the fabric 2 with the said latex, along which lines I bond to the fabric a small cord 3, such for example as is used for making chalk lines. This cord is easily attached to the fabric 2 by going over the line with the above mentioned latex or bonding material, then allowing the same to become tacky, and then sticking the cord 3 thereon.

A final covering material may then be applied to the outside of the form I. Preferably, this is in the form of a normally flat sheet of leather 4, as for example, soft calf, kangaroo, kid, or other types of leather, although it is to be understood that a suitable woven fabric may be used for this purpose instead. The leather is preferably treated to a double impregnation in order to effectively secure a setting of the impregnating material well within the leather while in the curved form in which the leather is positioned and is to be used on the form I, an elastic curved leather being thus obtained. In order to carry out the preliminary softening of the leather, I utilize two solutions of latex, one of which is the thick latex or bonding material, hereinabove referred to, and the other of which is a thinner solution made by adding three parts by volume of distilled water to one part by volume of said latex or bonding material. The leather 4 is laid on the table with the fresh side up and is made thoroughly wet with the thin latex solution, by applying the same with a brush. Next, all of the fabric 2 and cords 3 are thoroughly impregnated with the other or first mentioned latex or bonding material, that is to say the thicker solution. Then the superficial excess of the thin latex solution, which has been applied to the pieces of leather, is wiped off while the latex is still soft, that is to say has not set. The piece of leather 4 is now applied to the fabric and cords 3 and the leather is rubbed into place with a cloth covered with saddle soap. By means of this rubbing in and then tooling the leather by applying a tool in the form of a round pointed applicator to force the leather around the cords, the leather is worked into all the seams and detail formed by the junction of the cords and cloth over the form 1. As the bonding material sets, the leather will draw in closely to the contours and the lines and detail will come through sharply. When the latex has set in the leather, the shape and contour of the leather will remain in the set position indefinitely. The retention by the leather of this shape is insured by the method of double impregnation of the leather referred to and in a way which is not possible were the leather bonded to the other materials while still in a flat position. Any subsequent deformation of the leather applied in accordance with my process, accordingly, will tend to return of its own accord to the shape given to the leather initially on the last, and in which position the latex gives the leather a permanent elastic set.

The fabric 2 and leather 4 are now trimmed off wherever necessary, with a sharp knife, and particularly around the upper edge 5 above the cord 3. The upper edge may be finished with a lacing of a leather thong 6 as a fastening material.

As another modification of my invention I have shown a modified form in Fig. 3. The form shown in this figure is made in exactly the same way as the form in the other figures except in this instance, instead of the leather thong 6 I provide a cord 7, fastened in place by the first mentioned thick latex or bonding material, which is applied to the leather 4.

This application is a division of my Letters Patent No. 2,332,000, upon Method of manufacturing shoes, granted October 19, 1943, and a division of Ser. No. 479,531, filed March 17, 1943, now abandoned, upon Shoe and products adapted to form a part of a shoe, divided therefrom.

While I have described my invention above in detail I wish it to be understood that many changes may be made therein without departing from the spirit of the same.

I claim:

1. The process of making a form-returning elastic material, which comprises softening a body of leather by impregnating the same with relatively thin latex throughout the body of the leather, removing the excess of latex from the leather, applying to the leather before the said latex has set a coating of a relatively thick latex, then applying the leather to a form having uneven curved contours to which a lining fabric is adherent while conforming the leather to the said uneven curved contours of said form and allowing the latex to set throughout the body of leather in this uneven curved position.

2. The process of making a form-returning elastic material, which comprises softening a body of leather by impregnating the same with relatively thin latex throughout the body of the leather, removing the excess of latex from the leather, applying to the leather before the said latex has set a coating of a relatively thick latex, then applying the leather to a form having uneven curved contours to which a lining fabric is adherent, with an edging cord in curved position, while conforming the leather to the said uneven curved contours of said form, allowing the latex to set throughout the body of leather in this uneven curved position, and then cutting off the lining fabric and leather along the said cord so as to fasten the lining fabric and the leather edges to said cord.

3. The process of making a form-returning elastic material, which comprises softening a body of leather by impregnating the same with relatively thin latex throughout the body of the leather, removing the excess of latex from the leather, applying to the leather before the said latex has set a coating of a relatively thick latex, then applying the leather to a form having uneven curved contours to which a lining fabric is adherent having a cord attached to the fabric in curved position while conforming the leather to the said uneven curved contours of said form, allowing the latex to set throughout the body of leather in this uneven curved position, then cutting off the lining fabric and leather along the said cord so as to fasten the lining fabric and the leather edges to said cord.

4. The process of making a form-returning elastic material, which comprises softening a body of leather by impregnating the same with relatively thin latex throughout the body of the leather, removing the excess of latex from the leather, applying to the leather before the said latex has set a coating of a relatively thick latex, then working the leather, having therein the thin and thick latex before they have set and before its edge is in fixed position, onto a form having uneven curved contours to which a lining fabric is adherent while conforming the leather to the said uneven curved contours of said form, allowing the latex to set throughout the body of leather in this uneven curved position, and adding a binding material to the edge thereof.

5. The process of making a form-returning elastic material, which comprises softening a body of leather by impregnating the same with relatively thin latex throughout the body of leather, removing the excess of latex from the leather, applying to the leather before the said latex has set a coating of a relatively thick latex, then working the leather, having therein the thin and thick latex before they have set and before its edge is in fixed position, onto a form having uneven curved contours to which a lining fabric is adherent, with an edging cord in curved position, while conforming the leather to the said uneven curved contours of said form, allowing the latex to set throughout the body of leather in this uneven curved position, then cutting off the lining fabric and leather along the said cord so as to fasten the lining fabric and the leather edges to said cord, and adding a binding material to the edge thereof.

6. The process of making a form-returning elastic material, which comprises softening a body of leather by impregnating the same with relatively thin latex throughout the body of the leather, removing the excess of latex from the leather, applying to the leather before the said latex has set a coating of a relatively thick latex, then working the leather, having therein the thin and thick latex before they have set and before its edge is in fixed position, onto a form having uneven curved contours to which a lining fabric is adherent having a cord attached to the fabric in curved position while conforming the leather to the said uneven curved contours of said form, allowing the latex to set throughout the body of leather in this uneven curved position, then cutting off the lining fabric and leather along the said cord so as to fasten the lining fabric and the leather edges to said cord, and adding a binding material to the edge thereof.

7. A product comprising an elastic body of leather impregnated throughout the body of the leather with a form-retaining set latex retaining the leather normally in an uneven three dimensional position which is unnatural for the leather fastened to a fabric lining having said position formed by the set latex.

8. A product comprising an elastic body of leather impregnated throughout the body of the leather with a form-retaining set latex retaining the leather normally in an uneven three dimensional position which is unnatural for the leather fastened to a fabric lining having said position, formed with a cord edging, by the set latex.

9. A product comprising an elastic body of leather impregnated throughout the body of the leather with a form-retaining set latex retaining the leather normally in an uneven three dimensional position which is unnatural for the leather fastened to a fabric lining having said position, formed with an interposed cord edging, by the set latex.

10. A product comprising an elastic body of leather impregnated throughout the body of the leather with a form-retaining set latex retaining the leather normally in an uneven three dimensional position which is unnatural for the leather fastened to a fabric lining having said position formed by the set latex, a fastening material being applied to curved meeting edges of the leather and fabric.

11. A product comprising an elastic body of leather impregnated throughout the body of the leather with a form-retaining set latex retaining the leather normally in an uneven three dimensional position which is unnatural for the leather fastened to a fabric lining having said position, formed with a cord edging, by the set latex, a fastening material being applied to curved meeting edges of the leather and fabric.

12. A product comprising an elastic body of leather impregnated throughout the body of the leather with a form-retaining set latex retaining the leather normally in an uneven three dimensional position which is unnatural for the leather fastened to a fabric lining having said position, formed with an interposed cord edging, by the set latex, a fastening material being applied to curved meeting edges of the leather and fabric.

ALAN E. MURRAY.

REFERENCES CITED

The following references are of record in the file of this patent:

UNITED STATES PATENTS

| Number | Name | Date |
|---|---|---|
| 1,516,571 | Moore | Nov. 25, 1924 |
| 2,132,399 | Cooper | Oct. 11, 1938 |